United States Patent [19]

Sasaki et al.

[11] 4,293,532

[45] Oct. 6, 1981

[54] PROCESS FOR PRODUCING HYDROGEN CHLORIDE AND AMMONIA

[75] Inventors: Hiromi Sasaki; Yoshiyuki Takahara, both of Ube, Japan

[73] Assignee: Central Glass Company, Limited, Ube, Japan

[21] Appl. No.: 154,469

[22] Filed: May 29, 1980

[30] Foreign Application Priority Data

Jun. 5, 1979 [JP] Japan ............................ 54/69424

[51] Int. Cl.³ .......................... C01B 7/08; C01C 1/02
[52] U.S. Cl. ................................. 423/356; 423/481; 423/520; 423/545
[58] Field of Search ................ 423/481, 356, 520, 545

[56] References Cited

U.S. PATENT DOCUMENTS 1,104,913  7/1914  Löffler .
2,735,749  2/1956  Prutton et al. .................. 423/481
2,744,811  5/1956  Haller ............................. 423/481
2,787,524  4/1957  Claflin ............................ 423/481
3,929,977  12/1975  Brennan ........................ 423/520

*Primary Examiner*—O. R. Vertiz
*Assistant Examiner*—Wayne A. Langel
*Attorney, Agent, or Firm*—Fleit & Jacobson

[57] ABSTRACT

A process for producing hydrogen chloride and ammonia, comprising the steps of carrying out the reaction of ammonium chloride with ammonium hydrogen sulfate in the state of molten salt to produce hydrogen chloride, and heating the reaction system at the above-mentioned reaction carrying step at a temperature of 300° C. or higher to produce ammonia gas, thereby hydrogen chloride and ammonia can be obtained in high yields, overcoming problems encountered in conventional corresponding processes.

16 Claims, No Drawings

PROCESS FOR PRODUCING HYDROGEN CHLORIDE AND AMMONIA

BACKGROUND OF THE INVENTION

This invention relates to a process for producing ammonia and hydrogen chloride using ammonium chloride as a raw material.

It is becoming an important industrial theme to recover ammonium and chlorine gas or hydrogen chloride in case using ammonium chloride as a raw material. In this regard, a decomposition process of ammonium chloride in the presence of a catalyst of an oxide of metal such as manganese or magnesium has been already proposed as a method for producing chloride gas or hydrogen chloride, not accompanying with the production of sodium hydroxide, which is particularly advantageous from a point of view of balance between sodium hydrogen oxide and chlorine. However, in this process, reactions are carried out by treating solids and therefore the following various problems have been encountered: a high reaction temperature above 500° C. is required, and additionally it is difficult to obtain an effective heat-transfer surface. Accordingly, the catalyst will sublimate and disperse under the action of high temperature, and piping will be clogged with the deteriorated and partially fused catalyst.

Otherwise, the production of the hydrogen chloride and ammonia is carried out as follows: ammonium chloride and sodium hydrogen sulfate are mixed and heated to produce hydrogen chloride according to an Equation 1, and thereafter the reaction temperature is further raised to produce ammonia according to an Equation (2).

$$2NH_4Cl + 2NaHSO_4 \rightarrow (NH_4)_2SO_4 + Na_2SO_4 + 2HCl \quad (1)$$

$$(NH_4)_2SO_4 + Na_2SO_4 \rightarrow 2NaHSO_4 + 2NH_3 \quad (2)$$

However, since the melting points of sodium hydrogen sulfate and sodium sulfate are 315° C. and 800° C., respectively, the reaction of the Equation 1, or the reactions of the Equations 1 and 2 in this process are carried out in solid phase. Accordingly, the contact of the reaction products does not seem effective and therefore it is very difficult to completely carry out the reactions. Additionally, since the reaction of the Equation 2 is carried out at a temperature in the vicinity of the sublimation temperature of ammonium chloride, unreacted ammonium chloride at the Equation 1 sublimates as gaseous ammonium chloride which will be mixed into ammonia gas at the Equation 2. Recovering the thus mixed gaseous ammonium chloride is disadvantageous from a point of view of simplification of an apparatus for the reactions. Furthermore, the gaseous ammonium chloride attaches onto the inner surface of a upper section of a reactor, which becomes a cause of trouble. Moreover, if a larger amount of unreacted ammonium chloride is present, heat loss becomes greater by the amount corresponding to the amount of unreacted ammonium chloride. This is considerably disadvantageous from a stand point of thermal efficiency.

SUMMARY OF THE INVENTION

In accordance with the present invention, a process is provided wherein hydrogen chloride and ammonia are produced, using ammonium chloride as a raw material, by the steps of (1) carrying out the reaction of ammonium chloride with ammonium hydrogen sulfate in the state of molten salt to produce hydrogen chloride, and (2) heating the reaction system as the step (1) at a temperature of 300° C. or higher to produce ammonia gas. Preferably, hydrogen chloride gas produced at the step (1) is separated from the reaction system, and ammonia gas produced at the step (2) is separated from the reaction system.

A main object of the present invention is to provide an improved process for producing hydrogen chloride and ammonia, which overcomes drawbacks encountered in conventional processes for producing the same.

Another object of the present invention is to provide an improved process for producing hydrogen chloride and ammonia, which is advantageous from an industrial stand point, as compared with the conventional process for producing the same.

A further object of the present invention is to provide an improved process for producing hydrogen chloride and ammonia, in which a reaction can be effectively carried out with high yield of an objective reaction product, without rise of various problems caused under high temperature condition.

A still further object of the present invention is to provide an improved process for producing hydrogen chloride and ammonia, in which a reaction is carried out in the state of molten salt under a relatively low temperature condition, whereby the contact of the raw materials in the reaction mixture can be improved, preventing unnecessary sublimation of materials in the reaction system.

DETAILED DESCRIPTION OF THE INVENTION

The process of producing ammonia and hydrogen chloride in accordance with the present invention, comprises a first step represented by an Equation 3 which ammonium chloride is added to a molten salt of ammonium hydrogen sulfate to produce ammonium sulfate and hydrogen chloride, and a second step represented by an Equation 4 in which the thus produced ammonium sulfate is subjected to a thermal decomposition to produce ammonium hydrogen sulfate and ammonia.

$$NH_4Cl + NH_4HSO_4 \rightarrow (NH_4)_2SO_4 + HCl \quad (3)$$

$$(NH_4)_2SO_4 \rightarrow NH_4HSO_4 + NH_3 \quad (4)$$

In the first step, ammonium hydrogen sulfate and the molten salt of ammonium chloride are kept at a temperature within range from 150° to 280° C., preferably within a range from 200° to 260° C., to produce hydrogen chloride gas. If this temperature exceeds 280° C., the produced ammonium sulfate will decompose to produce ammonia gas, which is disadvantageous. In this step, it is preferable to expel the produced hydrogen chloride gas outside of a reaction system by means of stirring, introducing air, steam, or an inert gas, or sucking it out, in order to cause the reaction to further proceed. The molten salt which has completed in reaction for producing hydrogen chloride is supplied for the second step.

In the second step, ammonium sulfate is kept at a temperature above the decomposition temperature thereof of 280° C., preferably within a range from 320° to 380° C., to produce ammonia gas. If this temperature exceeds 380° C., the decomposition reaction of ammonium hydrogen sulfate is caused to produce SO₃ gas. This SO₃ reacts with ammonia gas resulting from the decomposition of ammonium chloride in gas phase to produce solid ammonium hydrogen sulfate which will be attached in the surface of the piping of a reaction apparating, accompanying with similarly attached solid ammonium sulfate, which will become a cause of clogging of the piping of the reaction apparatus. Additionally, this will cause the corrosion and heat loss of the reaction apparatus. In this case, it is preferable to expel ammonia gas by means of stirring, introducing air, steam, or an inert gas, or sucking it out. After hydrogen chloride and ammonia gas have been produced in the amounts corresponding to a predetermined amount of ammonium chloride, the molten salt of the ammonium hydrogen sulfate is again supplied to the first step, newly adding ammonium chloride to carry out the reaction for producing hydrogen chloride. Thus, the molten salt of ammonium hydrogen sulfate is used to be recirculated from the second step to the first step.

In view of the fact that the melting temperature of the ammonium hydrogen sulfate is 147° C., it is preferable that the mol ratio of ammonium chloride and ammonium hydrogen sulfate is 1:1.5 or more, in order to obtain molten salt which is high in fluidity.

According to the process according to the present invention, the rate of production of ammonia gas at the second step is high as compared with a conventional process using sodium hydrogen sulfate, and it is possible to carry out the reaction at a low temperature as compared with the same conventional process. As a result, the amount of ammonium chloride to sublimate can be reduced, and accordingly there is no fear of preventing heat transfer and clogging in piping the reaction apparatus, resulting from attaching of the ammonium chloride onto the inner wall surface of the reaction apparatus. This is considerably advantageous from an industrial standpoint.

It is to be noted that, in the first step of the process of hydrogen chloride gas production reaction according to the present invention, as the mol proportion of the ammonium hydrogen sulfate increases relative to that of the raw material ammonium chloride, the rate of reaction becomes higher. In the second step or the ammonia gas production reaction, as the mol proportion of ammonium hydrogen sulfate becomes smaller relative to that of the raw material ammonium chloride, the rate of reaction becomes higher.

It is necessary to maintain a molten state of ammonium hydrogen sulfate in order to improve the contact of it with introduced gas. In this regard, it is preferable to maintain the mol ratio of ammonium chloride and ammonium hydrogen sulfate at 1:1.5–5.0. If the mol ratio is lower than 1:1.5, it is difficult to maintain the molten state, and whereas even if the mol ratio is higher than 1:5.0, an effect corresponding to such a high ratio cannot be expected. Therefore, more preferably the mol ratio is within a range of from 1:1.5–1:3.0.

In order to increase the rate of ammonia gas production at the second step, it is preferable to add ammonium sulfate and/or a sulfate of alkali metal at the first step or the second step. Also in this case, it is desirable to increase the proportion of mol of ammonium hydrogen sulfate relative to ammonium chloride in order to maintain the molten state of this reaction system. By virtue of ammonium sulfate to be added, a larger amount of ammonia which is capable of decomposing than the equivalent amount of the prepared ammonium chloride is added to increase the rate of reaction, thereby producing ammonia in the equivalent amount with the prepared ammonium chloride.

In other words, as the reaction proceeds, the rate of reaction becomes gradually lower, and therefore a further long period of time is necessary to complete the reaction. In this regard, in order to effectively achieve the reaction within a short period of time, it is advisable to almost complete the reaction for the prepared ammonium chloride though the reaction rate for the entire ammonia amount in the reaction system is relatively low, and therefore the addition of ammonium sulfate results in a high yield of ammonia.

As the above-mentioned sulfate of alkali metal, sodium sulfate, potassium sulfate etc. are used, by which the reaction system is maintained at alkali side thereby assisting the production of ammonia. It is to be noted that the mol ratio of ammonium chloride, ammonium hydrogen sulfate, and ammonium sulfate and/or the sulfate of alkali metal is preferably 1.0:1.5–10:0–1.0, and more preferably 1.0:1.5–4.0:0–0.5. If the amount of ammonium sulfate and/or the sulfate of alkali metal is much larger in the above-mentioned ratio, the rate of production of hydrogen chloride gas is lowered, which is disadvantageous.

The invention will be understood more readily with reference to the following examples; however these examples are intended to illustrate the invention and are not to be construed to limit the scope of the invention.

EXAMPLE 1

Various mixtures in which the proportion of mol of ammonium hydrogen sulfate relative to ammonium chloride was varied were packed into a reaction tube, and heated by a heating apparatus for heating the outside of the tube to obtain a molten salt. Air was then blown in the obtained molten salt at the rate of 110 ml/min. to produce hydrogen chloride gas. The thus produced hydrogen chloride gas was introduced into caustic soda aqueous solution to measure the amount of the thus produced hydrogen chloride. The reaction temperature was raised to 254° C. within 15 minutes, and thereafter it was maintained at a constant level of 254° C.

TABLE 1

| Experiment No. | 1 | 2 | 3 | 4 |
|---|---|---|---|---|
| $\frac{NH_4HSO_4}{NH_4CL}$ (mol ratio) | 1.1 | 1.5 | 2.0 | 2.5 |
| 0.5 hour | 31.4% | 40.5% | 54.5% | 60.9% |
| 1.0 hour | 43.1% | 49.8% | 65.5% | 71.8% |
| 1.5 hours | — | 55.7% | 74.0% | 78.0% |
| 2.0 hours | 61.0% | — | — | — |
| 3.0 hours | 67.0% | 79.9% | 88.6% | — |
| 5.0 hours | — | 86.6% | 93.4% | 92.5% |

Various mol percents of the trapped produced hydrogen chloride relative to the prepared ammonium chloride are shown in Table 1.

Subsequently, with respect to Experiment Nos. 3 and 4 (in Table 1), after the hydrogen chloride production reaction of 5 hours, ammonia production reactions were carried out by raising the reaction temperatures to 352° C. (in Experiment No. 3) and to 352° C. (in Experiment No. 4). As a result, in Experiment No. 3, the yield of ammonia gas reached 53.8% relative to the prepared ammonium chloride at the time point at which 1 hour lapsed after the initiation of raising the reaction temperature. The yield reached 63.2% at the time point at which 2 hours lapsed after the initiation of raising the reaction temperature.

In the Experiment No. 4, the yield reached 60.3% at the time point at which 1 hour lapsed after reaction temperature raising, 70.3% at the time point at which 2 hours lapsed after the reaction temperature raising, and 73.5% at the time point at which 2.5 hours lapsed after the reaction temperature raising.

EXAMPLE 2

In order to obtain a molten salt, 2.5 mol ammonium hydrogen sulfate and 0.5 mol ammonium sulfate were mixed with 1 mol ammonium chloride, and the thus formed mixture was prepared into a reaction tube. Air was supplied into the reaction tube at a rate of 110 ml/min., and the reaction temperature was kept at 254° C. The yield of the produced hydrogen chloride was 81.9% relative to the prepared ammonium chloride by the reaction for 3 hours, and 86.6% by the reaction for 5 hours. Subsequently, the temperature in the reaction tube was raised to 352° C. to carry out ammonia production reaction. At the time point of 2.5 hours lapsed after the temperature raising, the yield of produced ammonia gas reached 90.6% relative to the prepared ammonium chloride. As will be appreciated from the above, the yield of produced hydrogen chloride is similar to in the case of Experiment No. 4 in Example 1; however, the yield of produced ammonia gas is much improved as compared with in Experiment No. 4 in Example 1. This exhibits that the addition of ammonium sulfate contributes to an increase in the yield of produced ammonia.

EXAMPLE 3

Ammonium chloride, ammonium hydrogen sulfate, and ammonium sulfate were mixed with each other in a mol ratio of 1.0:2.8:0.3, respectively, to obtain a molten salt, and the reaction was carried out under the same experimental conditions as in Example 2. As a result, the yield of produced hydrogen chloride at 254° C. was 87.3% at the time point of 5 hours lapse. Thereafter, the reaction temperature was raised to 352° C. to carry out ammonia production reaction subsequent to the hydrogen chloride production reaction. As a result, the yield of produced ammonia was 85.4% at the time point of 2.5 hours lapse.

EXAMPLE 4

Assuming that hydrogen chloride production reaction was carried out with the yield of 100% by mixing 1 mol ammonium hydrogen sulfate to 1 mol ammonium chloride, a reaction product containing 1 mol ammonium hydrogen chloride, 1 mol ammonium sulfate, and 0.2 mol sodium sulfate would be obtained. In this Example, a mixture containing the same composition as this reaction product was prepared into a reaction tube, and then the ammonia production reaction for this mixture was carried out under the condition where the amount of air supplied into the reaction tube was 110 ml/min., and the reaction temperature was 352° C. As a result, the yield of produced ammonia was 78.7% in 1 hour reaction time, 94.7% in 2 hours reaction time, and 98.8% in 2.5 hours reaction time. In cases where sodium sulfate was not added, the yield was 69.0% in 1 hour reaction time, and 87.7% in 2.5 hours reaction time, under the same reaction conditions as in the above.

EXAMPLE 5

3 mol ammonium hydrogen chloride and 0.5 mol sodium sulfate were mixed with 1 mol ammonium chloride to obtain a molten salt, and then prepared into a reaction tube. Thereafter, air was supplied into the reaction tube at a rate of 110 ml/min., and the reaction temperature in the reaction tube was kept at 202° C. The yield of hydrogen chloride relative to the prepared ammonium chloride was 50.4% at the time point after 1 hour, and 74.2% at the time point after 3 hours. Subsequently, the temperature was immediately raised to 331° C., continuing air supply to the reaction tube. As a result, the yield of ammonia was 44.4% at the time point of 1 hour after the temperature raising, and 65.2% at the time of 3 hours after the temperature raising.

What is claimed is:

1. A process for producing hydrogen chloride and ammonia, comprising the following steps of:
   reacting ammonium chloride with molten ammonium hydrogen sulfate to produce hydrogen chloride gas;
   heating the resulting reaction mixture at a temperature of 280° C. or higher to produce ammonia gas; and adding at least one alkali metal sulfate during said reacting or heating step.
2. A process as claimed in claim 1, wherein the mol ratio of ammonium chloride to ammonium hydrogen sulfate is 1:1.5 or more.
3. A process as claimed in claim 2, wherein the mol ratio of ammonium chloride to ammonium hydrogen sulfate is 1:1.5-5.0.
4. A process as claimed in claim 3, wherein the mol ratio of ammonium chloride to ammonium hydrogen sulfate is 1:1.5-3.0.
5. A process as claimed in claim 1, further comprising the step of separating hydrogen chloride gas produced in said reaction carrying step from the reaction system.
6. A process as claimed in claim 5, wherein said heating step is carried out after said hydrogen chloride gas separating step.
7. A process as claimed in claim 1, wherein said reacting step is carried out at a temperature ranging from 150° to 280° C.
8. A process as claimed in claim 7, wherein said reacting step is carried out at a temperature ranging from 200° to 260° C.
9. A process as claimed in claim 1, wherein the mol ratio of ammonium chloride to ammonium hydrogen sulfate to said at least one alkali metal sulfate is 1.0:1.5-10.0:0-1.0.
10. A process as claimed in claim 9, wherein the mol ratio of ammonium chloride to ammonium hydrogen sulfate to said at least one alkali metal sulfate is 1.0:1.5-4.0:0-0.5.
11. A process as claimed in claim 1, further comprising the step of separating ammonia gas produced at said heating step from the reaction system.
12. A process as claimed in claim 1, wherein said heating step is carried out at a temperature ranging from 320° to 380° C.
13. A process as claimed in claim 1, wherein said alkali metal sulfate is a compound selected from the group consisting of sodium sulfate and potassium sulfate.
14. A process for producing hydrogen chloride and ammonia, comprising the following steps of:

reacting ammonium chloride with molten ammonium hydrogen sulfate to produce hydrogen chloride gas;

adding at least one alkali metal sulfate during said reacting step; and heating the resulting reaction mixture at a temperature of 280° C. or higher to produce ammonia gas.

15. A process for producing hydrogen chloride and ammonia, comprising the following steps of:

reacting ammonium chloride with molten ammonium hydrogen sulfate to produce hydrogen chloride gas;

heating the resulting reaction mixture at a temperature of 280° C. or higher to produce ammonia gas; and adding at least one alkali metal sulfate during said heating step.

16. A process for producing hydrogen chloride and ammonia, comprising the following steps of:

reacting ammonium chloride with molten ammonium hydrogen sulfate to produce hydrogen chloride gas;

adding at least one alkali metal sulfate during said reacting step, wherein the mol ratio of ammonium chloride to ammonium hydrogen sulfate to said at least one alkali metal sulfate is 1.0:1.5–10: not more than 1.0; and heating the resulting reaction mixture at a temperature of 280° C. of higher to produce ammonia gas.

* * * * *